United States Patent
Duan et al.

(10) Patent No.: US 11,427,316 B2
(45) Date of Patent: Aug. 30, 2022

(54) BIONIC VISUAL NAVIGATION CONTROL SYSTEM AND METHOD THEREOF FOR AUTONOMOUS AERIAL REFUELING DOCKING

(71) Applicant: BEIHANG UNIVERSITY, Beijing (CN)

(72) Inventors: Haibin Duan, Beijing (CN); Yongbin Sun, Beijing (CN); Yimin Deng, Beijing (CN); Long Xin, Beijing (CN); Han Li, Beijing (CN); Xiaobin Xu, Beijing (CN); Lun Fei, Beijing (CN); Mengzhen Huo, Beijing (CN); Lin Chen, Beijing (CN); Huaxin Qiu, Beijing (CN); Daifeng Zhang, Beijing (CN); Yankai Shen, Beijing (CN); Ning Xian, Beijing (CN); Chen Wei, Beijing (CN); Rui Zhou, Beijing (CN)

(73) Assignee: BEIHANG UNIVERSITY, BeiJing (CN)

( * ) Notice: Subject to any disclaimer, the term of this patent is extended or adjusted under 35 U.S.C. 154(b) by 1007 days.

(21) Appl. No.: 16/147,240

(22) Filed: Sep. 28, 2018

(65) Prior Publication Data

US 2019/0031347 A1    Jan. 31, 2019

(30) Foreign Application Priority Data

Jul. 31, 2018 (CN) .......................... 201810856669.9

(51) Int. Cl.
 B64C 39/02    (2006.01)
 G06T 7/73    (2017.01)
 (Continued)

(52) U.S. Cl.
 CPC ............ *B64C 39/024* (2013.01); *B64D 39/06* (2013.01); *G05B 6/02* (2013.01); *G05B 17/02* (2013.01); *G05D 1/0088* (2013.01); *G05D 1/0094* (2013.01); *G06T 7/11* (2017.01); *G06T 7/74* (2017.01); *G06T 7/90* (2017.01);
 (Continued)

(58) Field of Classification Search
 CPC .................................................. B64C 39/024
 See application file for complete search history.

(56) References Cited

U.S. PATENT DOCUMENTS

10,618,673 B2 * 4/2020 Chan ...................... G06V 20/17
11,046,430 B1 * 6/2021 Melton ................ G08G 5/0052
 (Continued)

*Primary Examiner* — Jean Paul Cass (57) ABSTRACT

A bionic visual navigation control system for autonomous aerial refueling docking includes: a tanker/receiver bottom layer control module, a multi-wind disturbances hose-drogue stable control module, an enable and select module, a close-range bionic vision relative navigation module, and a receiver relative position precise control module. A bionic visual navigation control method for autonomous aerial refueling docking is also provided. The present invention aims at improving the reliability, anti-interference and accuracy of the close-range relative navigation in the autonomous air refueling docking stage, and designs a matching relative position accurate control method with control switch, thereby improving the accuracy of close-range navigation and control, thereby promoting the successful realization of probe-and-drogue autonomous aerial refueling and improving the autonomy of UAVs.

2 Claims, 5 Drawing Sheets

(51) Int. Cl.
  *G06T 7/11* (2017.01)
  *G06T 7/90* (2017.01)
  *B64D 39/06* (2006.01)
  *G05B 6/02* (2006.01)
  *G05B 17/02* (2006.01)
  *G05D 1/00* (2006.01)

(52) U.S. Cl.
  CPC .. *B64C 2201/063* (2013.01); *B64C 2201/128* (2013.01); *B64C 2201/143* (2013.01); *G06T 2207/10024* (2013.01); *G06T 2207/30204* (2013.01); *G06T 2207/30248* (2013.01)

(56) References Cited

U.S. PATENT DOCUMENTS

| | | | |
|---|---|---|---|
| 11,175,146 B2* | 11/2021 | Naman | G06T 7/593 |
| 2013/0135707 A1* | 5/2013 | Lopez | G01S 5/16 |
| | | | 359/291 |
| 2017/0301109 A1* | 10/2017 | Chan | G06T 7/73 |
| 2019/0359345 A1* | 11/2019 | Rix | B64D 39/00 |
| 2021/0006919 A1* | 1/2021 | Kashina | H04S 7/302 |

\* cited by examiner

BIONIC VISUAL NAVIGATION CONTROL SYSTEM AND METHOD THEREOF FOR AUTONOMOUS AERIAL REFUELING DOCKING

CROSS REFERENCE OF RELATED APPLICATION

The present invention claims priority under 35 U.S.C. 119(a-d) to CN 201810856669.9, filed Jul. 31, 2018.

BACKGROUND OF THE PRESENT INVENTION

Field of Invention

The present invention relates to a bionic visual navigation control system and a method thereof for autonomous aerial refueling docking, belonging to a technical field of unmanned aerial vehicle navigation and control.

Description of Related Arts

Autonomous aerial refueling (AAR) technology is an effective way to solve the defects of UAVs (Unmanned Aerial Vehicles) in terms of load and endurance, and improve the performance of UAVs. The aerial refueling technology can significantly improve the endurance of UAVs, so as to improve the capabilities of mission execution and autonomy.

The probe-and-drogue autonomous aerial refueling is mainly divided into four stages: rendezvous, docking, refueling and separating. Compared with other stages, the docking stage of probe-and-drogue aerial refueling is the most complicated, which needs the highest requirements for the precise navigation and control system. The docking stage of probe-and-drogue autonomous aerial refueling not only needs to accurately obtain the position information of the drogue in the presence of multi-wind disturbances, but also needs to accurately control the relative position between the receiver and drogue. Therefore, it is crucial to design a reasonable and efficient navigation and control method for autonomous aerial refueling of UAVs. The present invention provides a bionic visual navigation control system and a method for the docking stage of autonomous aerial refueling, so as to improve the precision of the close-range navigation and relative position control of the UAVs during docking, thereby promoting the successful realization of probe-and-drogue autonomous aerial refueling and enhancing the autonomy of UAVs.

Conventionally, navigation technologies commonly used in autonomous aerial refueling include inertial navigation systems and differential GPS (Global Positioning System) systems. Inertial navigation systems have the drawback of accumulating errors over time. Although GPS technology is very convenient to use, its accuracy and anti-interference ability need to be strengthened because it relies on satellites for positioning. Moreover, since the drogue connected to the tanker is constantly changing with respect to the position and attitude of the tanker under the multi-wind disturbances, even if the relative position and attitude information between the tanker and the receiver are obtained by inertia and GPS navigation, it is also impossible to achieve accurate docking between the drogue and probe. Therefore, the conventional navigation method cannot achieve close-range relative navigation of the drogue and probe. At the same time, in different stages of autonomous aerial refueling, the control objectives of the receiver are different, thus the same control law cannot meet different control targets. Besides, switch between GPS and visual signals happens during the docking stage. Therefore, it is necessary to design accurate relative position control of the unmanned receiver in forward, lateral and altitude directions. The present invention solves the defects of feasibility, anti-interference and accuracy of the conventional probe-and-drogue autonomous aerial refueling navigation method on the close-range navigation of the drogue and probe, and designs the receiver's different position accurate control laws considering the switch of GPS and visual navigation. Therefore, based on bionic vision, an autonomous aerial refueling close-range relative navigation control system and a method are designed.

The visual navigation technology extracts the feature points of the target through image processing to perform pose measurement, thereby providing guidance information for the UAV. Compared with other navigation systems, the visual sensor has advantages such as light weight, low power consumption, small size and low cost. In addition, the working band of the visual navigation system is far away from the frequency range of the current electromagnetic confrontation, and the drogue's position and attitude information measured by the visual navigation system is more accurate. Since visual navigation can meet the requirements of pose measurement during the swinging process of the drogue under the influence of multi-wind disturbances, it has a close fit with the requirements of stability, accuracy and anti-interference of the close-range relative navigation in the docking stage. The present invention provides a bionic visual navigation control system and method for the docking stage of autonomous aerial refueling, which solves the problem of accurate pose measurement of the drogue and accurate position control of the receiver for the docking stage of current probe-and-drogue autonomous aerial refueling, thereby promoting the successful realization of probe-and-drogue autonomous aerial refueling and effectively improving the autonomy of UAVs.

SUMMARY OF THE PRESENT INVENTION

A bionic visual navigation control system and a method thereof for autonomous aerial refueling docking are provided. The object of the present invention is to provide a navigation control system and a method for probe-and-drogue autonomous aerial refueling docking stage, aiming at improving the reliability, anti-interference and accuracy of the close-range relative navigation in the autonomous aerial refueling docking stage, and designing a matching relative position accurate control method with control switch, thereby improving the accuracy of close-range navigation and control, so as to promote the successful realization of probe-and-drogue autonomous aerial refueling and enhance the autonomy of UAVs.

Aiming at solving the problems of close-range navigation and control in the docking stage of probe-and-drogue autonomous aerial refueling, the present invention develops a bionic visual navigation control system for autonomous aerial refueling docking stage as follows.

Figure 1:
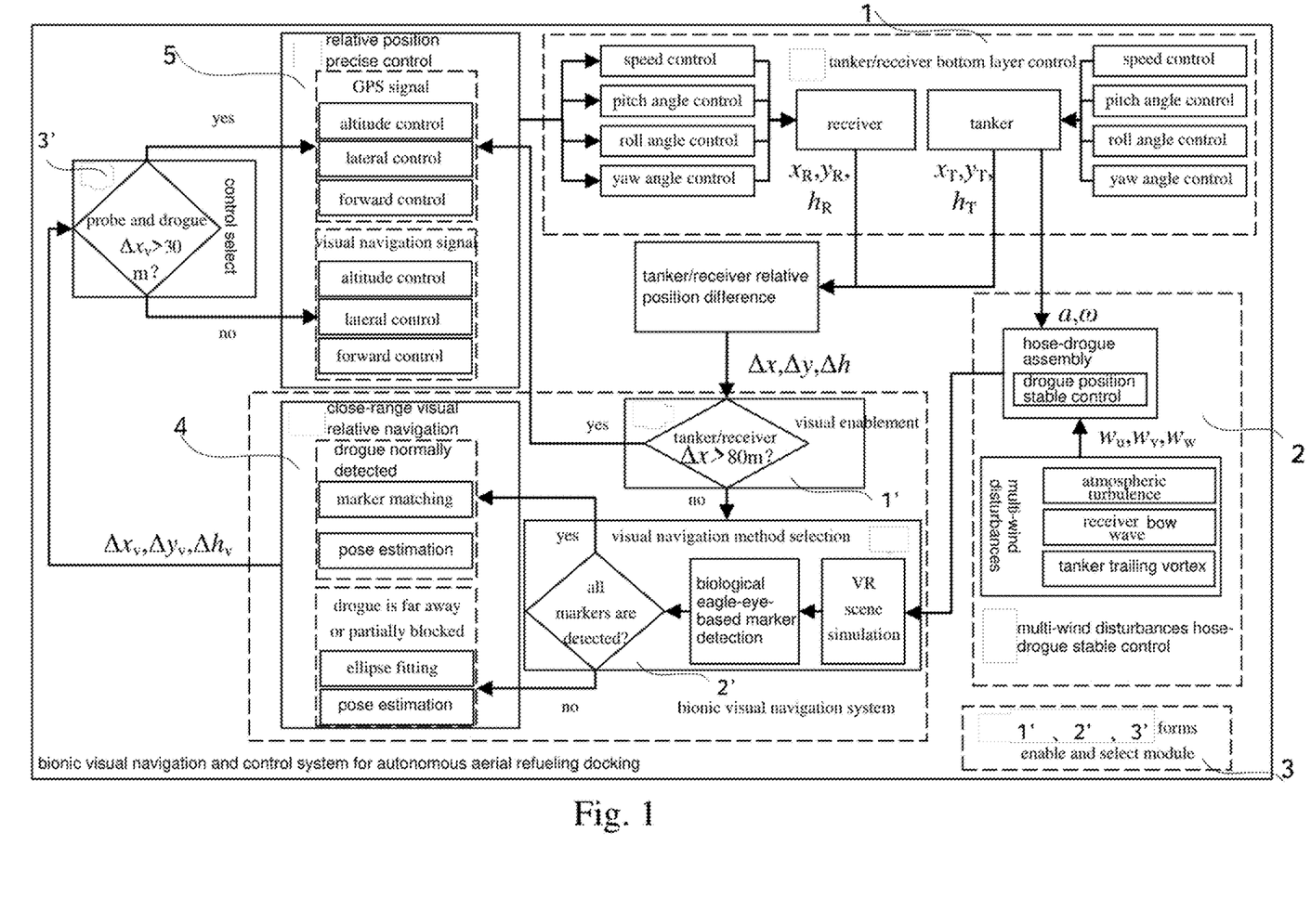
FIG. 1 is the framework of the bionic visual navigation control system and method.
Figure 2:
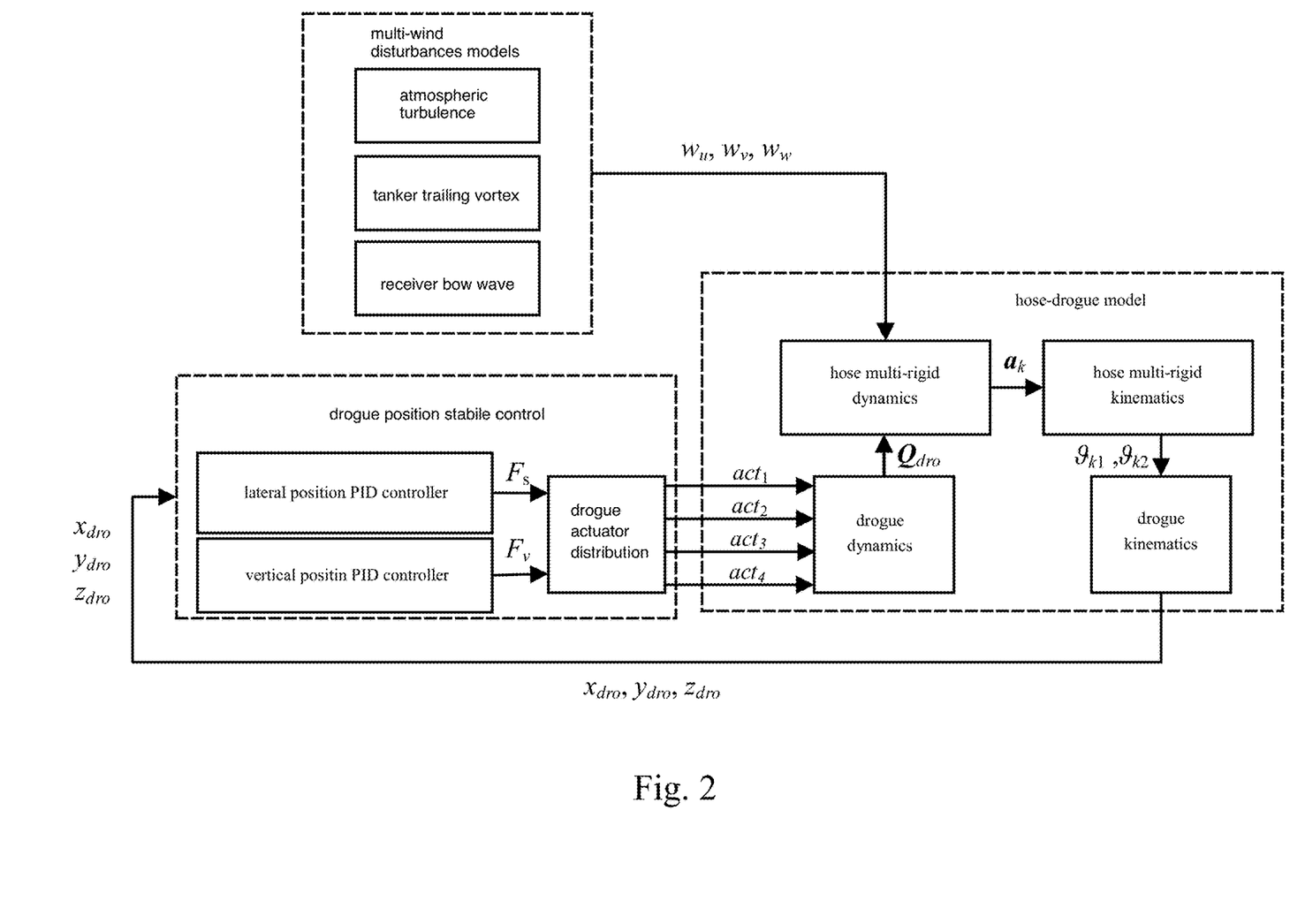
FIG. 2 is the structural view of hose-drogue position stability control of autonomous aerial refueling.

A system framework is shown in FIG. 1, wherein the bionic visual navigation control system comprises five parts: a tanker/receiver bottom layer control module, a multi-wind disturbances hose-drogue stable control module, an enable and select module, a close-range bionic vision relative navigation module, and a receiver relative position precise control module; wherein 1) the tanker/receiver bottom layer control module comprises tanker/receiver pitch angle, roll angle, yaw angle and speed controllers; the pitch angle controller controls an elevator, wherein the inner ring of the pitch angle controller is pitch angle speed PI (Proportional Integral) controller, and a proportional feedback of attack angle is used to stabilize the receiver; the outer ring of the pitch angle controller is adopted as the form of PI controller, and the inner ring pitch angle speed command is calculated by the outer ring for pitch angle stability and control; the roll angle controller controls an aileron, wherein the inner ring of the roll angle controller is roll angle speed PI controller; the outer ring of the roll angle controller is roll angle PI control, and the inner ring roll angle speed command is calculated by the outer ring for roll angle stability and control; the yaw angle controller controls a rudder, wherein a proportional feedback of yaw angle speed is used to stabilize the receiver, and yaw angle PI controller is used for yaw angle stability and control; the speed controller controls the throttle thrust, wherein speed PI control is used to calculate a desired engine thrust for speed stability and control; in the autonomous aerial refueling docking stage, a receiver obtains a pitch angle command, a roll angle command and a speed command through the receiver relative position precise control module as the inputs of the tanker/receiver bottom layer control module; since the straightened sideslip deviation control is adopted to eliminate the lateral position differences, the yaw angle remains at zero; assume that the tanker makes fixed straight level flight, its pitch angle maintains at the trim state value, and its roll and yaw angles remain at zero;

2) the multi-wind disturbances hose-drogue stable control module comprises a hose-drogue model, multi-wind disturbances models (atmospheric turbulence, receiver bow wave and tanker trailing vortex) and drogue position stability controller; wherein as shown in FIG. 2, the hose-drogue model comprises hose multi-rigid dynamics and kinematics, as well as drogue dynamics and kinematics; a hose-drogue assembly is fixed with the tanker; the hose-drogue model established is formed by a plurality of mass-concentrated links (a hose) and a drogue which is controllable; the links and the drogue are vulnerable to the multi-wind disturbances; the multi-wind disturbances models comprises an atmospheric turbulence model, a tanker trailing vortex model and a receiver bow wave model which establish a wind disturbance environment for probe-and-drogue autonomous aerial refueling docking stage, so as to enhance the authenticity of a simulation system; wind speed components of three atmospheric disturbances in three directions are obtained by simulation, and wind speed is superimposed; a composite wind speed acts on a mass center of the hose and the drogue, thus affecting aerodynamic forces of the hose and the drogue, leading to a dramatic swing of the stable position of the hose and the drogue and difficulties in autonomous docking; the drogue position stability control comprises a drogue lateral position PID (Proportional Integral Derivative) controller, a vertical position PID controller, and a drogue actuator distribution, wherein for reducing the difficulties of autonomous docking, the drogue lateral position PID controller and the vertical position PID controller are designed according to the stable position of the drogue to obtain desired active control forces along lateral and vertical directions; according to drogue aerodynamics, the corresponding actuators of the drogue are used to generate the actual active control forces, thereby reducing a swinging range of the drogue and reducing difficulties of autonomous docking;

3) the enable and select module comprises visual enablement (1'), visual navigation method selection (2') and control selection (3'), wherein the visual enablement (1') activates the bionic visual navigation system, obtains images in virtual reality (VR) simulation and performs visual navigation processing; the visual navigation method selection (2') is firstly provided, comprising VR visual simulation, eagle-eye marker detection, and judging whether all markers are detected, wherein drogue markers in an VR image are processed with the eagle-eye marker detection, according to whether all designed markers on the drogue are detected, different close-range vision relative navigation methods are selected; the control selection (3') determines whether to use a visual navigation signal according to the calculated visual position differences between the probe and the drogue;

4) the close-range bionic vision relative navigation module comprises two situations of: the drogue is normally detected, and the drogue is far away or partially blocked; according to a visual navigation method selection (2') result, if the drogue is normally detected, then marker matching is performed, so as to perform accurate pose estimation; if the drogue is far away or partially blocked, thus the marker are not completely detected, then ellipse fitting is performed according to color information of the drogue, so as to perform pose estimation; and 5) the receiver relative position precise control module comprises receiver altitude controller, lateral deviation controller and forward deviation controller; wherein the altitude controller uses the pitch angle control as the inner ring, and the forward deviation control uses the speed control as the inner ring; the lateral deviation control adopts a receiver straightened sideslip method, and uses the rolling angle as the inner ring; relative position precise control is achieved by feeding back the relative positions between the tanker and the receiver.

Figure 3:
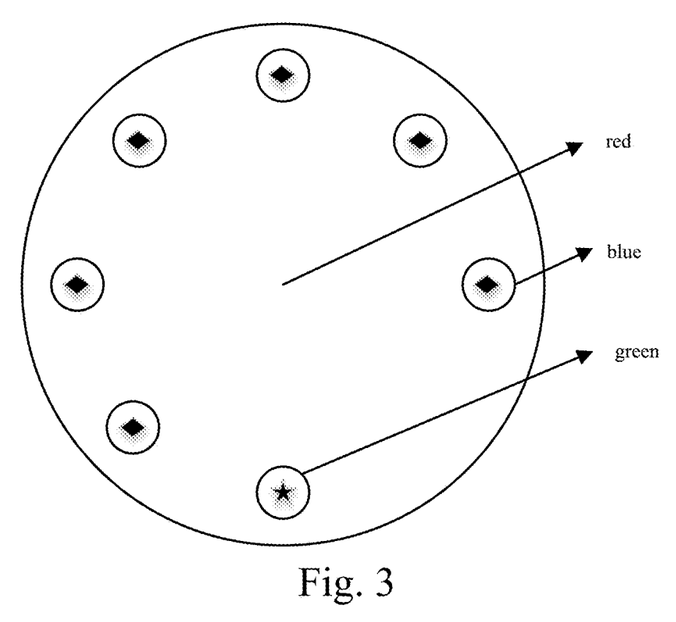
FIG. 3 is schematic diagram of drogue markers of the autonomous aerial refueling.

A bionic visual navigation control method for autonomous aerial refueling docking is also provided, comprising steps of:

step 1: establishing a receiver model, a hose-drogue model and multi-wind disturbances models, and setting the initial states, specifically comprising steps of:

establishing a six-degree-of-freedom nonlinear tanker/receiver model:

$$\begin{cases} \dot{x}_g = u\cos\theta\cos\psi + v(\sin\phi\sin\theta\cos\psi - \cos\phi\sin\psi) + \\ \quad w(\sin\phi\sin\psi + \cos\phi\sin\theta\cos\psi) \\ \dot{y}_g = u\cos\theta\sin\psi + v(\sin\phi\sin\theta\sin\psi + \cos\phi\sin\psi) + \\ \quad w(-\sin\phi\cos\psi + \cos\phi\sin\theta\sin\psi) \\ \dot{h} = u\sin\theta - v\sin\phi\cos\theta - w\cos\phi\cos\theta \\ \dot{V} = \frac{u\dot{u} + v\dot{v} + w\dot{w}}{V} \\ \dot{\alpha} = \frac{u\dot{w} - w\dot{u}}{u^2 + w^2} \\ \dot{\beta} = \frac{\dot{v}V - v\dot{V}}{V^2\cos\beta} \\ \dot{\phi} = p + (r\cos\phi + q\sin\phi)\tan\theta \\ \dot{\theta} = q\cos\phi - r\sin\phi \\ \dot{\psi} = \frac{1}{\cos\theta}(r\cos\phi + q\sin\phi) \\ \dot{p} = \frac{1}{I_xI_z - I_{xz}^2}[I_zL + I_{xz}N + (I_x - I_y + I_z)I_{xz}pq + (I_yI_z - I_z^2 + I_{xz}^2)qr] \\ \dot{q} = \frac{1}{I_y}[M - I_{xz}(p^2 - r^2)] \\ \dot{r} = \left(\frac{I_x(I_x - I_y) + I_{xz}^2}{I_xI_z - I_{xz}^2}p - \frac{(I_x - I_y + I_z)I_{xz}}{I_xI_z - I_{xz}^2}r\right)q + \\ \quad \frac{I_{xz}}{I_xI_z - I_{xz}^2}L + \frac{I_x}{I_xI_z - I_{xz}^2}N \end{cases} \quad (1)$$

wherein $\dot{x}_g$, $\dot{y}_g$, $\dot{h}$, $\dot{V}$, $\dot{\alpha}$, $\dot{\beta}$, $\dot{\phi}$, $\dot{\theta}$, $\dot{\psi}$, $\dot{p}$, $\dot{q}$, $\dot{r}$ are respectively the first derivatives of three direction positions of an aerial vehicle, the airspeed, the attack angle, the sideslip angle, the roll angle, the pitch angle, the yaw angle, the roll angle speed, the pitch angle speed, and the yaw angle speed; u, v, w are respectively components of the airspeed V along axes of the aircraft-body coordinate system, whose first derivatives are $\dot{u}, \dot{v}, \dot{w}$; L, M, N are respectively the aerodynamic rolling moment, the pitching moment and the yawing moment; $I_x, I_y, I_z, I_{xz}$ are the moments of inertia; and establishing a hose-drogue multi-rigid link-connected model, dividing a hose into N links, and expressing state angles of each of the links as $\vartheta_{ki}$ (k=1, 2, . . . , N; i=1, 2).

$$\ddot{\vartheta}_{ki} = \frac{d_{k,\vartheta_{ki}} \cdot \left(a_k - a_{k-1} - \sum_{j=1}^{2} (\dot{d}_{k,\vartheta_{kj}} \dot{\vartheta}_{kj}) - \right.}{\left. \dot{d}_{k,l_k} \dot{l}_k - d_{k,l_k} \ddot{l}_k - (a_w \times d_k) - (\omega_w \times \dot{d}_k) \right)} \quad (2)$$

wherein $d_k$ is the distance vector of the hose link k−1 pointing to the hose link k; $a_k$ is the acceleration of the hose link k; $l_k$ is the length of the hose link k; $\alpha_w$ is the implicated angular acceleration; $\omega_w$ is the implicated angle speed; the partial derivative $d_{k;\Theta_{ki}}=\partial d_k/\partial \vartheta_{ki}$ (i=1,2), $d_{k,l_k}=\partial d_k/\partial l_k$;

wherein the multi-wind disturbances models established comprise a tanker trailing vortex model, a receiver bow wave model and an atmospheric turbulence model; the tanker trailing vortex module adopts the Hallock-Burnham model; the receiver bow wave module adopts the Rankine half-body model; and the atmospheric turbulence model uses the Dryden turbulence model;

step 2: controlling drogue position stability, specifically comprising steps of:

respectively designing controllable drogue lateral and vertical position PID stability controllers according to a stable position of a drogue in a stable flow field (free flow and trailing vortex); obtaining the changing angles of four control surfaces of the controllable drogue through the drogue actuator distribution; changing the aerodynamic forces of the drogue for resisting influence of multi-wind disturbances on a drogue position, so as to maintain the drogue within an acceptable swinging range;

step 3: calculating the relative position of the tanker and the receiver, and performing visual enablement judgment, specifically comprising steps of:

during an initial stage of docking, processing the tanker position $x_T, y_T, h_T$ and the receiver position $x_R, y_R, h_R$ with difference calculation, so as to obtain the relative position $\Delta x, \Delta y, \Delta h$; judging whether to enable the visual navigation system; if $\Delta x > \Delta x_{thr}$, providing relative position precise control under the GPS signal, and executing the step 4; otherwise, activating the bionic visual navigation system, and executing steps 5-7;

step 4: performing the relative position precise control under the GPS signal, specifically comprising steps of:

respectively designing the tanker/receiver relative position precise control laws of the altitude, the forward deviation and the lateral deviation;

wherein altitude controller uses the pitch angle controller as the inner ring, which adopts a PID control form:

$$\begin{cases} \theta_{cmd} = k_P^h \cdot e_h + k_I^h \cdot \int e_h + k_D^h \cdot \dot{e}_h \\ e_h = \Delta h_{cmd} - \Delta h \end{cases} \quad (3)$$

wherein $\theta_{cmd}$ is the inner ring pitch angle command; $e_h$ is the altitude deviation; $\Delta h_{cmd}$ is the expected tanker/receiver altitude difference; $\Delta h$ is the actual tanker/receiver altitude difference; $k_P^h, k_I^h, k_D^h$ are respectively the proportional, integral and derivative coefficients of altitude;

wherein forward deviation controller uses the speed controller as the inner loop, which is not allowed for the overshoot of forward deviation. The forward deviation controller adopts a proportional control form:

$$\begin{cases} V_{cmd} = k_P^x \cdot e_x \\ e_x = \Delta x_{cmd} - \Delta x \end{cases} \quad (4)$$

wherein $V_{cmd}$ is the inner ring speed command; $e_x$ is the forward deviation; $\Delta x_{cmd}$ is the expected tanker/receiver forward difference; $\Delta x$ is the actual tanker/receiver forward difference; $k_P^x$ is the forward proportional coefficient;

wherein lateral deviation controller adopts the straightened sideslip deviation control method, which uses a rolling angle controller as the inner ring, and rudder controller eliminates the yaw angle; straightened sideslip deviation controller adopts a PD control form, and an integral process with a threshold is added to improve accuracy of the lateral deviation controller:

$$\begin{cases} \phi_{cmd} = k_P^y \cdot e_y + k_I^y \cdot \int_{e_y < e_y^{thr}} e_y + k_D^y \cdot \dot{e}_y \\ e_y = \Delta y_{cmd} - \Delta y \end{cases} \quad (5)$$

wherein $\phi_{cmd}$ is the inner ring roll angle command; $e_y$ is the lateral deviation; $\Delta y_{cmd}$ is the expected tanker/receiver lateral difference; $\Delta y$ is the actual tanker/receiver lateral difference; $e_y^{thr}$ is the lateral deviation integral threshold, when $e_y < e_y^{thr}$, the integral process with the threshold is activated; $k_P^y, k_I^y, k_D^y$ are respectively lateral deviation proportional, integral and derivative coefficients;

wherein the inner ring speed controller, the pitch angle controller, the roll angle controller and the yaw angle controller are designed according to the classic flight control system;

step 5: utilizing eagle-eye color vision mechanism for navigation method selection, specifically comprising steps of:

in a VR scene, defining the drogue to be red and marking with a green marker and six blue markers on the periphery as shown in FIG. 3;

using the eagle-eye color vision mechanism to construct the eagle-eye color region and marker detection method by extracting signal information of different bands in a drogue image; wherein the eagle-eye long wave channel mainly absorbs the red signal in a Red-Green-Blue (RGB) image and suppresses other colors, response of the long wave channel increases as the proportion of the R channel gray value in the RGB image increases; similarly, the medium wave channel and the short wave channel respectively absorb green and blue signals in the RGB image, and suppresses other color signals; the ultraviolet channel absorbs the luminance signal in the image; gray value contrasts of red, green and blue components are respectively maintained in the long wave channel, the medium wave channel, and the short wave channel, and gray value contrast of other color components are weakened to construct the eagle-eye color vision model, detect the color information of the drogue and extract the markers; the equation is as follows:

$$\begin{cases} I_L = \max(L_{thr}, \min(r-g, r-b)) \\ I_M = \max(M_{thr}, \min(g-r, g-b)) \\ I_S = \max(S_{thr}, \min(b-r, b-g)) \\ I_U = (r+g+b)/3 \end{cases} \quad (6)$$

wherein $I_L$, $I_M$, $I_S$, $I_U$ are image output responses of the long wave channel, the medium wave channel, the short wave channel and the ultraviolet channel; r,g,b indicate the gray values of the three color channels in the color image; $L_{thr}$, $M_{thr}$, $S_{thr}$ are long wave, medium wave and short wave thresholds; $\max(s_1, s_2)$ is the maximum value of $s_1$ and $s_2$; $\min(s_1, s_2)$ is the minimum value of $s_1$ and $s_2$; and firstly, processing the image obtained in the VR scene with color segmentation by the eagle-eye color vision mechanism, and selecting the output response image of the long wave channel for binarization processing, thereby obtaining a binary image containing only the information of the red region; filling holes of the binary image containing only the red region, and eliminating noises, so as to obtain a drogue binary image; combining (making "and" operation) the drogue binary image with the original image (the image obtained in the VR scene) to obtain a color image containing only the drogue; using the image color segmentation method based on the eagle-eye color vision mechanism for color segmentation of the color image containing only the drogue; selecting the output response image of the medium wave channel for binarization processing, thereby obtaining a binary image containing the green circular marker, and then performing blob detection to obtain the number of the green circular marker and the central pixel coordinate of the corresponding marker; selecting the output response image of the short wave channel for binarization processing, thereby obtaining a binary image containing the blue circular markers, and then performing blob detection to obtain the number of the blue circular markers and the central pixel coordinates of the corresponding markers; summing the green marker and the blue markers to determine whether all seven markers are detected; if all the markers are detected, executing the step 6; otherwise, executing the step 7;

step 6: performing close-range bionic visual navigation when all the markers are detected, specifically comprising steps of:

if all the markers on the drogue are detected, matching the markers; according to the coordinates of all the markers detected in the step 5, performing convex hull transformation to clockwise sort the coordinates of all the markers; then determining the initial green marker; according to the coordinate of the green marker detected in the step 5, processing the coordinates of all the seven markers with square difference in turn, wherein the coordinate with minimum square difference is the coordinate of the green marker; finally, matching the remaining six blue markers clockwise, so as to obtain the matching result of all the markers; and for all correctly matched markers, using the RPnP (A Robust Solution to the Perspective-n-Point Problem) algorithm, which is described in embodiment in detail and will not be illustrated here, for precise pose measurement, thereby obtaining the drogue's position in the camera coordinate system and converting between the camera coordinate system, the aircraft-body coordinate system and the earth-surface inertial coordinate system, so as to obtain the position difference $\Delta x_v$, $\Delta y_v$, $\Delta h_v$ between the drogue and the probe under the earth-surface inertial coordinate system;

step 7: performing close-range bionic visual navigation when the drogue is far away or partially blocked, specifically comprising steps of:

wherein when the drogue is far away, some or even all the markers cannot be detected because the markers are too small; when the drogue is too close to the probe, the probe will block some of the markers; therefore, when such two situations occur, the close-range bionic visual navigation with incomplete detection of the markers is required;

firstly, processing the image obtained in the VR scene with color segmentation by the eagle-eye color vision mechanism, and selecting the output response image of the long wave channel for binarization processing, thereby obtaining the binary image containing only the red region; filling the holes of the binary image containing only the red region, and eliminating the noises, so as to obtain the drogue binary image; combining (making "and" operation) the drogue binary image with the original image (the image obtained in the VR scene) to obtain the color image containing only the drogue; then extract edge points of the drogue from the color image containing only the drogue, and performing ellipse fitting on edge pixel points to obtain four vertex pixel points of the ellipse circumscribed rectangle; finally, matching the four vertex pixel points according to the actual size circumscribed rectangle of the drogue;

using matched vertex pixel points for RPnP precise pose measurement, thereby obtaining the drogue's position in the camera coordinate system and converting between the camera coordinate system, the aircraft-body coordinate system and the earth-surface inertial coordinate system, so as to obtain the position difference $\Delta x_v$, $\Delta y_v$, $\Delta h_v$ between the drogue and the probe under the earth-surface inertial coordinate system;

step 8: choosing the GPS signal or the bionic visual navigation signal for control and designing bionic visual navigation controllers, specifically comprising steps of:

when the distance in x direction between the tanker and the receiver is less than $\Delta x_{thr}$ and the position difference $\Delta x_v$, $\Delta y_v$, $\Delta h_v$ is obtained by close-range bionic vision relative navigation through the steps 5-7, judging whether the forward position difference $\Delta x_v$ obtained by the bionic visual navigation is greater than $\Delta x_{thr}^v$; if $\Delta x_v > \Delta x_{thr}^v$, using the GPS signal for navigation control, and performing precise position control according to the step 4; if $\Delta x_v < \Delta x_{thr}^v$, using the bionic visual navigation signal for navigation control;

wherein the visual navigation control law uses the position precise control form of the step 4:

$$\theta_{cmd}^v = k_P^{vh} \cdot \Delta h_v + k_I^{vh} \cdot \int \Delta h_v + k_D^{vh} \cdot \Delta \dot{h}_v \quad (7)$$

$$V_{cmd}^v = k_P^{vx} \cdot \Delta x_v \quad (8)$$

$$\phi_{cmd}^v = k_P^{vy} \cdot \Delta y_v + k_I^{vy} \cdot \int_{\Delta y_v < \Delta y_v^{thr}} \Delta y_v + k_D^{vy} \cdot \Delta \dot{y}_v \quad (9)$$

wherein, $\theta_{cmd}^v$, $V_{cmd}^v$ and $\phi_{cmd}^v$ are respectively the inner ring pitch angle command, the speed command, and the roll angle command; $k_P^{vy}$, $k_I^{vh}$, $k_D^{vh}$, $k_P^{vx}$, $k_P^{vy}$, $k_I^{vy}$, $k_D^{vy}$ are respectively the altitude, forward deviation and lateral deviation proportional, integral and derivative coefficients of bionic visual navigation controllers; and $\Delta y_v^{thr}$ is the lateral deviation integral threshold; and step 9: determine if docking is successful, specifically comprising steps of:

when bionic visual navigation $\Delta x_v < \Delta x_v^{thr}$, judging whether $\Delta y_v$ and $\Delta h_v$ are less than $\Delta y_v^{thr}$, $\Delta h_v^{thr}$; if so, docking is successful, then ending the docking process; otherwise, docking fails, then decelerating the receiver, and setting the forward deviation target to $\Delta x_v^{tar}$, in such a manner that the relative distance in x direction between the tanker and the receiver will be controlled to $\Delta x_v^{tar}$ and the docking process will be restarted.

The present invention provides a bionic visual navigation control system and a method for the docking stage of autonomous aerial refueling, and advantages and effects thereof are as follows: 1. The present invention provides a complete probe-and-drogue autonomous aerial refueling docking stage navigation and control system framework and its working process, which are reasonable and efficient, and can meet the requirements of probe-and-drogue autonomous aerial refueling docking stage. 2. The present invention simulates the eagle-eye color vision mechanism to construct the eagle-eye color region and marker detection method, and improves the efficiency and accuracy of the detection of the drogue region and markers. 3. The present invention provides switching logic for bionic visual navigation and GPS navigation, and provides two different visual navigation methods to solve the problem of visual navigation when the markers are far away or partially blocked. The visual navigation of the whole process of the docking area is realized, and the anti-interference and stability of the visual navigation are improved. 4. The present invention designs the control laws of the receiver under the GPS signal and the visual navigation signal, and switches therebetween, so as to improve accuracy of the relative position control.

These and other objectives, features, and advantages of the present invention will become apparent from the following detailed description, the accompanying drawings, and the appended claims.

SYMBOL REFERENCE $(\Delta x, \Delta y, \Delta h)$—relative position of tanker and receiver
$(x_R, y_R, h_R)$—receiver position
$(x_T, y_T, h_T)$—tanker position
$(\Delta x_v, \Delta y_v, \Delta h_v)$—drogue position obtained by bionic visual navigation
$(w_u, w_v, w_w)$—three components of superimposed wind disturbance
a—tanker acceleration
$\omega$—tanker angle speed
$(x_{dro}, y_{dro}, z_{dro})$—drogue position
$F_s$—expected lateral active control force of drogue
$F_v$—expected vertical active control force of drogue
$(act_1, act_2, act_3, act_4)$—four opening angles of drogue's actuators
$(\vartheta_{k1}, \vartheta_{k2})$—two state angles of k-th link of hose
$a_k$—acceleration of k-th link of hose
$Q_{dro}$—drogue aerodynamic force

DETAILED DESCRIPTION OF THE PREFERRED EMBODIMENT

Referring to FIGS. 1-5 of the drawings, effectiveness of the bionic visual navigation control system and method are verified by an embodiment of the present invention. The bionic visual navigation control system and method thereof for autonomous aerial refueling docking are as follows. The system framework is shown in FIG. 1, wherein the bionic visual navigation control system comprises five parts: a tanker/receiver bottom layer control module 1, a multi-interference hose-drogue stable control module 2, an enable and select module 3, a close-range bionic vision relative navigation module 4, and a receiver relative position precise control module 5.

Figure 4:
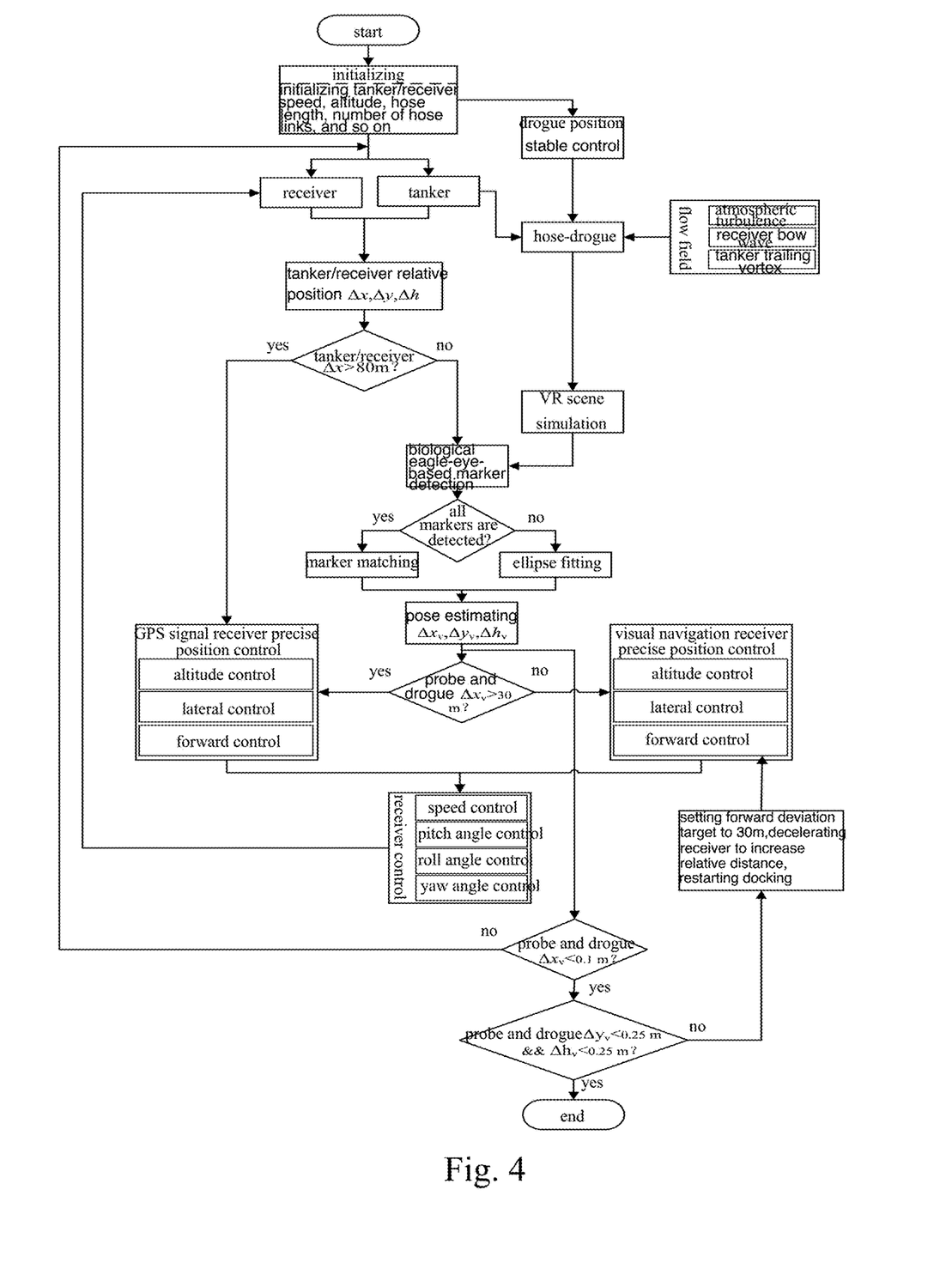
FIG. 4 is the flow chart of the bionic visual navigation control system and method for autonomous aerial refueling docking.

FIG. 4 is the flow chart of the method, comprising steps of:

step 1: establishing a receiver model, a hose-drogue model and multi-wind disturbances models, and setting the initial states According to equations (1) to (2), the receiver model and the hose-drogue model are respectively established. Assume that the midpoint of the line connecting two vortex centers at trailing edges of wings is the origin $O_v$; $Y_v$ axis coincides with the center line, and the positive direction points to the right wing tip; $X_v$ axis and $Z_v$ axis are respectively parallel to the corresponding axes of the tanker-body coordinate system, thus the trailing vortex coordinate system $O_v X_v Y_v Z_v$ is established. The wind speed of the Hallock-Burnham model is $v_{vor} = [v_{vorx}\ v_{vory}\ v_{vorz}]$, wherein based on the model's feature $v_{vorx} \approx 0$, the other two components are calculated as follows:

$$v_{vory} = \frac{\Gamma_0}{2\pi} \left[ \frac{z_{rel}}{(y_{rel} - \pi b_T/8)^2 + r_c^2 + z_{rel}^2} - \frac{z_{rel}}{(y_{rel} + \pi b_T/8)^2 + r_c^2 + z_{rel}^2} \right] \quad (10)$$

$$v_{vorz} = \frac{\Gamma_0}{2\pi} \left[ \frac{y_{rel} + \pi b_T/8}{(y_{rel} - \pi b_T/8)^2 + r_c^2 + z_{rel}^2} - \frac{y_{rel} - \pi b_T/8}{(y_{rel} + \pi b_T/8)^2 + r_c^2 + z_{rel}^2} \right] \quad (11)$$

wherein $(x_{rel}\ y_{rel}\ z_{rel})$ is the coordinate of a point in the trailing vortex coordinate system; $\Gamma_0$ is the initial strength of the trailing vortex and $\Gamma_0 = 4G_T/(\pi \rho V_T b_T)$, $G_T$ is gravity of the tanker, $\rho$ is density of the atmosphere, $V_T$ is the speed of the tanker, $b_T$ is span of the tanker; $r_c$ is the radius of the trailing vortex and $r_c = 0.5\sqrt{-x_{rel}/V_T}$.

The receiver bow wave Rankine half-body model can be obtained by superposition of an average flow and a point source flow. Assume that the center of gravity of the point source flow is the origin $O_b$; $X_b$, $Y_b$ and $Z_b$ are respectively parallel to the corresponding axes of the receiver-body coordinate system, thus the bow wave coordinate system $O_b X_b Y_b Z_b$ is established. The bow wave wind speed can be expressed as $v_{bow} = [v_{bowx}\ v_{bowy}\ v_{bowz}]$, specific expression of three components is as follows:

$$v_{bowx} = v_r\cos\eta - v_\theta\sin\eta \quad (12)$$

$$v_{bowy} = (v_r\sin\eta + v_\theta\cos\mu)\frac{y_b^2}{\sqrt{y_b^2+z_b^2}}$$

$$v_{bowz} = (v_r\sin\eta + v_\theta\cos\eta)\frac{z_b^2}{\sqrt{y_b^2+z_b^2}}$$

wherein $(x_b, y_b, z_b)$ is the coordinate of a point in the bow wave coordinate system; in the polar coordinate system having the origin $O_b$, the radial speed $v_r$ and the circumferential speed $v_e$ of the bow wave model can be expressed as:

$$v_r = U\cos\eta + \frac{Q_b}{2\pi r} \quad (13)$$

$$v_\eta = -U\sin\eta \quad (14)$$

wherein U is the average flow speed; $Q_b$ is the intensity of the point source flow, $Q_b=2\pi Ub_n$, $b_n=h_{nose}/\pi$, $h_{nose}$ is the maximum radius of the receiver's airframe in the width direction; r is the polar diameter; η is the polar angle.

The initial states of the tanker/receiver are: after autonomous rendezvous, receiver altitude $h_R$=7300 m, tanker/receiver speed $V_R=V_T$=180 n/s, initial distance between the tanker and the receiver Δx≈368 m, Δy≈0 m and Δh≈30 m, hose length l=22.86 m, number of hose links N=20, hose k-th link length $l_k$=l/N=1.143 m, tanker weight $m_T$=120000 kg, wingspan $b_T$=39.88 m, $U=V_T$, $h_{hose}$=0.4 m, ρ=1.293 kg/m³. The simulation step size is set to 0.02 s and the simulation time is set to 200 s with mild turbulence intensity.

step 2: controlling drogue position stability

During the first 50 s of simulation, the hose is subjected to a free flow and the tanker trailing vortex to obtain a relatively stable position. After the first 50 s of simulation, influence of the receiver bow wave and atmospheric turbulence are added, and the atmospheric turbulence is mild turbulence.

According to the stable position of the drogue of the simulation time t=50 s, lateral and vertical position PID controllers of the drogue are designed respectively, and changing angles of four control surfaces of the controllable drogue are obtained through the drogue actuator distribution, thereby changing the aerodynamic forces of the drogue for resisting influence of multi-wind disturbances on the drogue position.

step 3: calculating the relative position of the tanker and the receiver, and performing visual enablement judgment Processing the tanker position and the receiver position with difference calculation, so as to obtain the relative position Δx, Δy, Δh; if Δx>80 m (the distance between the drogue and the probe is about 40 m), providing relative position precise control under the GPS signal, and executing the step 4; otherwise, activating the bionic visual navigation system, and executing steps 5-7.

step 4: performing the relative position precise control under the GPS signal

The altitude controller is expressed as the equation (3), wherein altitude proportional, integral and derivative coefficients are $k_P^h$=0.45, $k_I^h$=0.1, $k_D^h$=0.65; the forward deviation controller is expressed as the equation (4), wherein the forward proportional coefficient is $k_P^x$=0.26; the lateral deviation controller is expressed as the equation (5), wherein lateral deviation proportional, integral and derivative coefficients are $k_P^y$=1.21, $k_I^y$=4, $k_D^y$=0.03, and the integral process threshold is $e_y^{thr}$=2 m.

step 5: utilizing eagle-eye color vision mechanism for navigation method selection Eagle-eye color vision detection method is expressed the equation (6), wherein long wave, medium wave and short wave thresholds are $L_{thr}$=20, $M_{thr}$=20, $S_{thr}$=20. Firstly, processing the image obtained in the VR scene with color segmentation by the eagle-eye color vision mechanism, and selecting the output response image of the long wave channel for binarization processing, thereby obtaining a binary image containing only the information of the red region; filling holes of the binary image containing only the red region, and eliminating noises, so as to obtain a drogue binary image; combining (making "and" operation) the drogue binary image with the original image (the image obtained in the VR scene) to obtain a color image containing only the drogue; using the image color segmentation method based on the eagle-eye color vision mechanism for color segmentation of the color image containing only the drogue; selecting the output response image of the medium wave channel for binarization processing, thereby obtaining a binary image containing the green circular marker, and then performing blob detection to obtain the number of the green circular marker and the central pixel coordinate of the corresponding marker; selecting the output response image of the short wave channel for binarization processing, thereby obtaining a binary image containing the blue circular markers, and then performing blob detection to obtain the number of the blue circular markers and the central pixel coordinates of the corresponding markers; summing the green marker and the blue markers to determine whether all seven markers are detected; if all the markers are detected, executing the step 6; otherwise, executing the step 7;

step 6: performing close-range bionic visual navigation when all the markers are detected If all the markers on the drogue are detected, matching the markers; according to the coordinates of all the markers detected in the step 5, performing convex hull transformation to clockwise sort the coordinates of all the markers; then determining the initial green marker; according to the coordinate of the green marker detected in the step 5, processing the coordinates of all the seven markers with square difference in turn, wherein the coordinate with minimum square difference is the coordinate of the green marker; finally, matching the remaining six blue markers clockwise, so as to obtain the matching result of all the markers.

Making the drogue's precise pose estimation by the RPnP pose estimation algorithm: 1) establish the fourth-order polynomials of the drogue markers, wherein in the drogue coordinate system, a line connecting two markers is selected as the rotation axis, the midpoint of the line is the coordinate origin, and the direction of the line is the Z-axis direction, so as to establish the new coordinate system $O_aX_aY_aZ_a$; coordinates of seven three-dimensional feature points in the original drogue coordinate system are converted into coordinates in the coordinate system $O_aX_aY_aZ_a$, and each three of seven three-dimensional markers in the new coordinate system are combined, thus form five point sets. According to the principle of triangular geometry, a fourth-order polynomial can be constructed for every three points. The five point sets can form an equation set with five fourth-order polynomials. 2) solution of the coordinates of the markers in the camera coordinate system is that each fourth-order polynomial in the fourth-order polynomial equation sets are processed with square sum, so as to construct an eighth-order cost function. By deriving the eighth-order cost function and then finding the zero solution of derivative of the cost function, at most four characteristic roots can be obtained. The characteristic roots are used to calculate the coordinates of the seven three-dimensional markers in the camera coordinate system, wherein the $Z_c$ axis determined by the coordinate $(P_{i0}^c, P_{j0}^c)$ in the camera coordinate system corresponding to the two markers forming the rotation axis in the first step of the RPnP algorithm is $Z_c = \overrightarrow{(P_{i0}^c \cdot P_{j0}^c)}/\|P_{i0}^c \cdot P_{j0}^c\|$;

3) pose solution is that since the $Z_a$ axis of the coordinate system $O_a X_a Y_a Z_a$ corresponds to the $Z_c$ axis in the camera coordinate system $O_c X_c Y_c Z_c$, the rotation matrix R between the two coordinate systems can be expressed as the equation of the rotation angle $\xi$, so that there is only one parameter $\xi$, wherein the equation is as follows:

$$R = H \cdot rot(Z_c, \xi) = \begin{bmatrix} h_1 & h_4 & h_7 \\ h_2 & h_5 & h_8 \\ h_3 & h_6 & h_9 \end{bmatrix} \begin{bmatrix} \cos\xi & -\sin\xi & 0 \\ \sin\xi & \cos\xi & 0 \\ 0 & 0 & 1 \end{bmatrix} \quad (15)$$

wherein H is the arbitrary orthogonal rotation matrix whose third column $[h_7\ h_8\ h_9]^T$ is equal to $Z_c$, $rot(Z_c, \xi)$ indicates the rotation angle around the $Z_c$ axis; according to the principle of camera imaging, the projection of the three-dimensional feature point to the two-dimensional normalized image plane can be expressed as:

$$\lambda_i \begin{bmatrix} u_i \\ v_i \\ 1 \end{bmatrix} = \begin{bmatrix} h_1 & h_4 & h_7 \\ h_2 & h_5 & h_8 \\ h_3 & h_6 & h_9 \end{bmatrix} \begin{bmatrix} \cos\xi & -\sin\xi & 0 \\ \sin\xi & \cos\xi & 0 \\ 0 & 0 & 1 \end{bmatrix} \begin{bmatrix} X_i \\ Y_i \\ Z_i \end{bmatrix} + \begin{bmatrix} t_x \\ t_y \\ t_z \end{bmatrix} \quad (16)$$

wherein $(u_i, v_i)$ is the pixel coordinate of the feature point, $(X_i, Y_i, Z_i)$ is the coordinate of the feature point in the coordinate system $O_a X_a Y_a Z_a$, $t=[t_x\ t_y\ t_z]^T$ is the translation vector between the coordinate system $O_a X_a Y_a Z_a$ and the camera coordinate system $O_c X_c Y_c Z_c$. In order to solve the parameter $[\cos\xi\ \sin\xi\ t_x\ t_y\ t_z\ 1]^T$, the equation (16) is solved, wherein each feature point can construct a 2×6 equation set; the equation sets formed by all the feature points are combined, and are solved by the singular value decomposition method, so as to obtain the rotation matrix R and the translation vector t between the two coordinate systems.

Finally, the drogue position in the camera coordinate system is obtained and converted between the camera coordinate system, the aircraft-body coordinate system and the earth-surface inertial coordinate system, so as to obtain the position difference $\Delta x_v$, $\Delta y_v$, $\Delta h_v$ between the drogue and the probe under the earth-surface inertial coordinate system.

step 7: performing close-range bionic visual navigation when the drogue is far away or partially blocked When the drogue is far away or the markers are partially blocked, processing the drogue with ellipse fitting and matching circumscribed rectangular pixel points; using matched vertex pixel points for RPnP precise pose measurement, thereby obtaining the drogue position in the camera coordinate system and converting between the camera coordinate system, the aircraft-body coordinate system and the earth-surface inertial coordinate system, so as to obtain the position difference $\Delta x_v$, $\Delta y_v$, $\Delta h_v$ between the drogue and the probe under the earth-surface inertial coordinate system.

step 8: choosing the GPS signal or the bionic visual navigation signal for control and designing bionic visual navigation controllers when the distance in x direction between the tanker and the receiver is less than $\Delta x_{thr}=80$ m, which means the distance between the drogue and the probe is about 40 m, and the position difference $\Delta x_v, \Delta y_v, \Delta h_v$ is obtained by close-range bionic vision relative navigation through the steps 5-7, if $\Delta x_v > 30$ m, using the GPS signal for navigation control, and performing precise position control according to the step 4; if $\Delta x_v < 30$ m, using the bionic visual navigation signal for navigation control.

Figure 5:
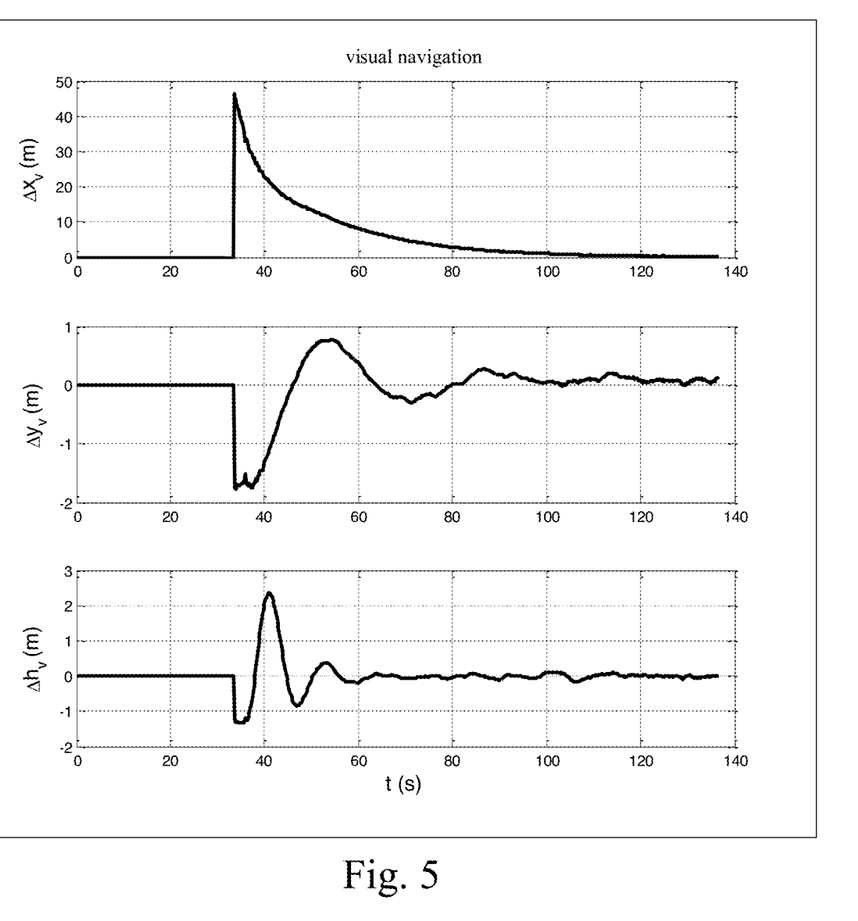
FIG. 5 is a position response curve of bionic visual navigation control for autonomous aerial refueling docking.

The visual navigation precise position controllers can be expressed as the equations (7)-(9), wherein visual navigation altitude control $k_P^{vh}=0.23$, $k_I^{vh}=0.04$, $k_D^{vh}=165$, forward deviation $k_P^{vx}=0.22$, lateral deviation $k_P^{vy}=0.23$, $k_I^{vy}=0.006$, $k_D^{vy}=0.12$, lateral deviation integral threshold $\Delta y_v^{thr}=0.3$ m.

step 9: determine if docking is successful, specifically comprising steps of:

when bionic visual navigation $\Delta x_v<0.1$ m, judging whether $\Delta y_v<0.25$ m and $\Delta h_v<0.25$ m; if so, docking is successful, then ending the docking process; otherwise, docking fails, then decelerating the receiver, and setting the forward deviation target to $\Delta x_v^{tar}=30$ m, in such a manner that the relative distance in x direction between the tanker and the receiver will be controlled to 30 m and the docking process will be restarted. FIG. 5 is the drogue position response curve of bionic visual navigation control during successful docking.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A bionic visual navigation control system for autonomous aerial refueling docking, comprising: a tanker/receiver bottom layer control module, a multi-wind disturbances hose-drogue stable control module, an enable and select module, a close-range bionic vision relative navigation module, and a receiver relative position control module; wherein 1) the tanker/receiver bottom layer control module comprises tanker/receiver pitch angle, roll angle, yaw angle and speed controllers; the pitch angle controller controls an elevator, wherein an inner ring of the pitch angle controller is pitch angle speed PI (Proportional Integral) controller, and a proportional feedback of attack angle is used to stabilize the receiver; an outer ring of the pitch angle controller is a pitch angle PI controller, and an inner ring pitch angle speed command is calculated by the outer ring for pitch angle stability and control; the roll angle controller controls an aileron, wherein an inner ring of the roll angle controller is roll angle speed PI controller; an outer ring of the roll angle controller is roll angle PI control, and an inner ring roll angle speed command is calculated by the outer ring for roll angle stability and control; the yaw angle controller controls a rudder, wherein a proportional feedback of yaw angle speed is used to stabilize the receiver, and yaw angle PI controller is used for yaw angle stability and control; the speed controller controls a throttle thrust, wherein speed PI control is used to calculate a desired engine thrust for speed stability and control; in an autonomous aerial refueling docking stage, the receiver obtains a pitch angle command, a roll angle command and a speed command through the receiver relative position precise control module as inputs of the tanker/receiver bottom layer control module; since a straightened sideslip deviation control is adopted to eliminate lateral position differences, a yaw angle remains at zero; assume that the tanker makes fixed straight level flight, a pitch angle thereof maintains at a trim state value, and roll and yaw angles remain at zero;

2) the multi-wind disturbances hose-drogue stable control module comprises a hose-drogue model, multi-wind disturbances models and drogue position stability controller; wherein, the hose-drogue model comprises hose multi-rigid dynamics and kinematics, as well as drogue dynamics and kinematics; a hose-drogue assembly is fixed with the tanker; the hose-drogue model established is formed by a plurality of mass-concentrated links and a drogue; the multi-wind disturbances models comprises an atmospheric turbulence model, a tanker trailing vortex model and a receiver bow wave model which establish a wind disturbance environment for probe-and-drogue autonomous aerial refueling docking stage, so as to enhance authenticity of a simulation system; wind speed components of three atmospheric disturbances in three directions are obtained by simulation, and wind speed is superimposed; a composite wind speed acts on a mass center of the hose and the drogue, thus affecting aerodynamic forces of the hose and the drogue, leading to a swing of the stable position of the hose and the drogue and difficulties in autonomous docking; the drogue position stability control comprises a drogue lateral position PID (Proportional Integral Derivative) controller, a vertical position PID controller, and a drogue actuator distribution, wherein for reducing difficulties of the autonomous docking, the drogue lateral position PID controller and the vertical position PID controller are designed according to the stable position of the drogue to obtain desired active control forces along lateral and vertical directions; according to drogue aerodynamics, corresponding actuators of the drogue are used to generate actual active control forces, thereby reducing a swinging range of the drogue and reducing the difficulties of the autonomous docking;

3) the enable and select module comprises visual enablement, visual navigation method selection, and control selection, wherein the visual enablement activates the bionic visual navigation system, obtains images in virtual reality (VR) simulation and performs visual navigation processing; the visual navigation method selection is firstly provided, comprising VR visual simulation, marker detection, and judging whether all markers are detected, wherein drogue markers in an VR image are processed with the eagle-eye marker detection, according to whether all designed markers on the drogue are detected, different close-range vision relative navigation methods are selected; the control selection determines whether to use a visual navigation signal according to calculated visual position differences between a probe and the drogue;

4) the close-range bionic vision relative navigation module comprises two situations of the drogue is completely detected, and the drogue is at a distance or partially blocked; according to a visual navigation method selection result, if the drogue is completely detected, then marker matching is performed, so as to perform accurate pose estimation; if the drogue is at a distance or partially blocked, thus the marker are not completely detected, then ellipse fitting is performed according to color information of the drogue, so as to perform pose estimation; and 5) the receiver relative position control module comprises a receiver altitude controller, a lateral deviation controller and a forward deviation controller; wherein the altitude controller uses the pitch angle control as an inner ring of the altitude controller, and the forward deviation controller uses the speed control as an inner ring of the forward deviation controller; the lateral deviation control adopts a receiver straightened sideslip method, and uses the rolling angle as an inner ring; relative position control is achieved by feeding back relative positions between the tanker and the receiver.

2. A bionic visual navigation control method for autonomous aerial refueling docking, comprising steps of:

step 1: establishing a receiver model, a hose-drogue model and multi-wind disturbances models, and setting initial states, comprising specific steps of:

establishing a six-degree-of-freedom nonlinear tanker/receiver model:

$$\begin{cases} \dot{x}_g = u\cos\theta\cos\psi + v\begin{pmatrix} \sin\phi\sin\theta\cos\psi - \\ \cos\phi\sin\psi \end{pmatrix} + w\begin{pmatrix} \sin\phi\sin\psi + \\ \cos\phi\sin\theta\cos\psi \end{pmatrix} \\ \dot{y}_g = u\cos\theta\sin\psi + v\begin{pmatrix} \sin\phi\sin\theta\sin\psi + \\ \cos\phi\sin\psi \end{pmatrix} + w\begin{pmatrix} \sin\phi\cos\psi + \\ \cos\phi\sin\theta\sin\psi \end{pmatrix} \\ \dot{h} = u\sin\theta - v\sin\phi\cos\theta - w\cos\phi\cos\theta \\ \dot{V} = \dfrac{u\dot{u} + v\dot{v} + w\dot{w}}{V} \\ \dot{\alpha} = \dfrac{u\dot{w} - w\dot{u}}{u^2 + w^2} \\ \dot{\beta} = \dfrac{\dot{v}V - v\dot{V}}{V^2\cos\beta} \\ \dot{\phi} = p + (r\cos\phi + q\sin\phi)\tan\theta \\ \dot{\theta} = q\cos\phi - r\sin\phi \\ \dot{\psi} = \dfrac{1}{\cos\theta}(r\cos\phi + q\sin\phi) \\ \dot{p} = \dfrac{1}{I_xI_z - I_{xz}^2}[I_zL + I_{xz}N + (I_x - I_y + I_z)I_{xz}pq + (I_yI_z - I_z^2 + I_{xz}^2)qr] \\ \dot{q} = \dfrac{1}{I_y}[M - I_{xz}(p^2 - r^2)] \\ \dot{r} = \left(\dfrac{I_x(I_x - I_y) + I_{xz}^2}{I_xI_z - I_{xz}^2}p - \dfrac{(I_x - I_y + I_z)I_{xz}}{I_xI_z - I_{xz}^2}r\right)q + \dfrac{I_{xz}}{I_xI_z - I_{xz}^2}L + \dfrac{I_x}{I_xI_z - I_{xz}^2}N \end{cases} \quad (1)$$

wherein $\dot{x}_g, \dot{y}_g, \dot{h}, \dot{V}, \dot{\alpha}, \dot{\beta}, \dot{\phi}, \dot{\theta}, \dot{\psi}, \dot{p}, \dot{q}, \dot{r}$ are respectively first derivatives of three direction positions of an aerial vehicle, an airspeed, an attack angle, a sideslip angle, a roll angle, a pitch angle, a yaw angle, a roll angle speed, a pitch angle speed, and a yaw angle speed; u,v,w are respectively components of an airspeed V along axes of an aircraft-body coordinate system, whose first derivatives are $\dot{u},\dot{v},\dot{w}$; L,M,N are respectively an aerodynamic rolling moment, a pitching moment and a yawing moment; $I_x, I_y, I_z, I_{xz}$ are moments of inertia; and establishing a hose-drogue multi-rigid link-connected model, dividing a hose into N links, and expressing state angles of each of the links as $\vartheta_{ki}$ (k=1, 2, . . . , N; i=1,2):

$$\vartheta_{ki} = \frac{d_{k,\vartheta_{ki}} \cdot \left( \begin{array}{c} a_k - a_{k-1} - \sum_{j=1}^{2}(d_{k,\vartheta_{kj}}\vartheta_{kj}) - d_{k,l_k}\ddot{l}_k - \\ \dot{d}_{k,l_k}\dot{l}_k - (\alpha_w \times d_k) - (\omega_w \times \dot{d}_k) \end{array} \right)}{d_{k,\vartheta_{ki}} \cdot d_{k,\vartheta_{ki}}} \quad (2)$$

wherein $d_k$ is a distance vector of the hose link k−1 pointing to a hose link k; $a_k$ is an acceleration of the hose link k; $l_k$ is a length of the hose link k; $\alpha_w$ is an implicated angular acceleration; $\omega_w$ is an implicated angle speed; a partial derivative $d_{k,\vartheta_{ki}} = \partial d_k / \partial \vartheta_{ki}$ (i=1,2), $d_{k,l_k} = \partial d_k / \partial l_k$;

wherein the multi-wind disturbances models established comprise a tanker trailing vortex model, a receiver bow wave model and an atmospheric turbulence model; the tanker trailing vortex module adopts a Hallock-Burnham model; the receiver bow wave module adopts a Rankine half-body model; and the atmospheric turbulence model uses a Dryden turbulence model;

step 2: controlling drogue position stability, comprising specific steps of:

respectively designing controllable drogue lateral and vertical position PID stability controllers according to a stable position of a drogue in a stable flow field; obtaining changing angles of four control surfaces of the controllable drogue through a drogue actuator distribution; changing the aerodynamic forces of the drogue for resisting influence of multi-wind disturbances on a drogue position, so as to maintain the drogue within an acceptable swinging range;

step 3: calculating a relative position of the tanker and the receiver, and performing visual enablement judgment, comprising specific steps of:

during an initial stage of docking, processing a tanker position $x_T$, $y_T$, $h_T$ and a receiver position $x_R$, $y_R$, $h_R$ with difference calculation, so as to obtain the relative position $\Delta x$, $\Delta y$, $\Delta h$; judging whether to enable a visual navigation system; if $\Delta x > \Delta x_{thr}$, providing relative position control under a GPS signal, and executing a step 4; otherwise, activating a bionic visual navigation system, and executing steps 5-7;

step 4: performing the relative position control under the GPS signal, comprising specific steps of:

respectively designing tanker/receiver relative position control laws of an altitude, a forward deviation and a lateral deviation;

wherein altitude controller uses a pitch angle controller as an inner ring, which adopts a PID control form:

$$\begin{cases} \theta_{cmd} = k_P^h \cdot e_h + k_I^h \cdot \int e_h + k_D^h \cdot \dot{e}_h \\ e_h = \Delta h_{cmd} - \Delta h \end{cases} \quad (3)$$

wherein $\theta_{cmd}$ is an inner ring pitch angle command; $e_h$ is an altitude deviation; $\Delta h_{cmd}$ is an expected tanker/receiver altitude difference; $\Delta h$ is an actual tanker/receiver altitude difference; $k_P^h$, $h_I^k$, $k_D^h$ are respectively proportional, integral and derivative coefficients of the altitude;

wherein forward deviation controller uses a speed controller as an inner loop, which is not allowed for overshoot of the forward deviation; the forward deviation controller adopts a proportional control form:

$$\begin{cases} V_{cmd} = k_P^x \cdot e_x \\ e_x = \Delta x_{cmd} - \Delta x \end{cases} \quad (4)$$

wherein $V_{cmd}$ is an inner ring speed command; $e_x$ is a forward deviation; $\Delta x_{cmd}$ is an expected tanker/receiver forward difference; $\Delta x$ is an actual tanker/receiver forward difference; $k_P^x$ is a forward proportional coefficient;

wherein lateral deviation controller adopts a straightened sideslip deviation control method, which uses a rolling angle controller as an inner ring, and rudder controller eliminates a yaw angle; a straightened sideslip deviation controller adopts a PD control form, and an integral process with a threshold is added to improve accuracy of the lateral deviation controller:

$$\begin{cases} \phi_{cmd} = k_P^y \cdot e_y + k_I^y \cdot \int\limits_{e_y < e_y^{thr}} e_y + k_D^y \cdot \dot{e}_y \\ e_y = \Delta y_{cmd} - \Delta y \end{cases} \quad (5)$$

wherein $\phi_{cmd}$ is an inner ring roll angle command; $e_y$ is a lateral deviation; $\Delta y_{cmd}$ is an expected tanker/receiver lateral difference; $\Delta y$ is an actual tanker/receiver lateral difference; $e_y^{thr}$ is a lateral deviation integral threshold, when $e_y < e_y^{thr}$, the integral process with the threshold is activated; $k_P^y$, $k_I^y$, $k_D^y$ are respectively lateral deviation proportional, integral and derivative coefficients;

wherein the inner ring speed controller, the pitch angle controller, the roll angle controller and the yaw angle controller are designed according to a classic flight control system;

step 5: utilizing a color vision mechanism for navigation method selection, comprising specific steps of:

in a VR scene, defining the drogue to be red and marking with a green marker and six blue markers on a periphery;

using the color vision mechanism to construct an eagle-eye color region and marker detection method by extracting signal information of different bands in a drogue image; wherein an eagle-eye long wave channel absorbs a red signal in a Red-Green-Blue (RGB) image and suppresses other colors, response of the long wave channel increases as a proportion of an R channel gray value in the RGB image increases; similarly, a medium wave channel and a short wave channel respectively absorb green and blue signals in the RGB image, and suppresses other color signals; an ultraviolet channel absorbs a luminance signal in the image; gray value contrasts of red, green and blue components are respectively maintained in the long wave channel, the medium wave channel, and the short wave channel, and gray value contrast of other color components are weakened to construct an eagle-eye color vision model, detect the color information of the drogue and extract the markers; an equation is as follows:

$$\begin{cases} I_L = \max(L_{thr}, \min(r - g, r - b)) \\ I_M = \max(M_{thr}, \min(g - r, g - b)) \\ I_S = \max(S_{thr}, \min(b - r, b - g)) \\ I_U = (r + g + b)/3 \end{cases} \quad (6)$$

wherein $I_L$, $I_M$, $I_S$, $I_U$ are image output responses of the long wave channel, the medium wave channel, the short wave channel and the ultraviolet channel; r, g, b indicate the gray values of the three color channels in the color image; $L_{thr}$, $M_{thr}$, $S_{thr}$ are long wave, medium wave and short wave thresholds; $\max(s_1, s_2)$ is a maximum value of $s_1$ and $s_2$; $\min(s_1, s_2)$ is a minimum value of $s_1$ and $s_2$; and firstly, processing the image obtained in the VR scene with color segmentation by the eagle-eye color vision mechanism, and selecting an output response image of the long wave channel for binarization processing, thereby obtaining a first binary image containing only the information of a red region; filling holes of the first binary image containing only the red region, and eliminating noises, so as to obtain a drogue binary image; combining the drogue binary image with the original image to obtain a color image containing only the drogue; using an image color segmentation method based on the eagle-eye color vision mechanism for color segmentation of the color image containing only the drogue; selecting an output response image of the medium wave channel for binarization processing, thereby obtaining a second binary image containing a green circular marker, and then obtaining a number of the green circular marker and a central pixel coordinate of a corresponding marker; selecting an output response image of the short wave channel for binarization processing, thereby obtaining a third binary image containing blue circular markers, and then performing blob detection to obtain a number of the blue circular markers and central pixel coordinates of corresponding markers; summing the green marker and the blue markers to determine whether all seven markers are detected; if all the seven markers are detected, executing a step 6; otherwise, executing a step 7;

step 6: performing close-range bionic visual navigation when all the markers are detected, comprising specific steps of:

if all the markers on the drogue are detected, matching the markers; according to the coordinates of all the markers detected in the step 5, clockwise sorting the coordinates of all the markers; then determining an initial green marker; according to the coordinate of the green marker detected in the step 5, processing the coordinates of all the seven markers with square difference in turn, wherein the coordinate with minimum square difference is the coordinate of the green marker; matching the remaining six blue markers clockwise, so as to obtain the matching result of all the markers; and for all correctly matched markers, using an RPnP algorithm for pose measurement, thereby obtaining a drogue's position in a camera coordinate system and converting between the camera coordinate system, an aircraft-body coordinate system and an earth-surface inertial coordinate system, so as to obtain a position difference $\Delta x_v$, $\Delta y_v$, $\Delta h_v$ between the drogue and a probe under the earth-surface inertial coordinate system;

step 7: performing close-range bionic visual navigation when the drogue is at a distance or partially blocked, comprising specific steps of:

wherein when the drogue is at a distance, some or even all the markers cannot be detected because the markers are smaller than a certain size; when the drogue is too close to the probe, the probe blocks some of the markers; therefore, the close-range bionic visual navigation with incomplete detection of the markers is required;

firstly, processing the image obtained in the VR scene with color segmentation by the eagle-eye color vision mechanism, and selecting the output response image of the long wave channel for binarization processing, thereby obtaining the first binary image containing only a red region; filling the holes of the first binary image containing only the red region, and eliminating the noises, so as to obtain the drogue binary image; combining the drogue binary image with the original image to obtain the color image containing only the drogue; then extract edge points of the drogue from the color image containing only the drogue, and performing ellipse fitting on edge pixel points to obtain four vertex pixel points of an ellipse circumscribed rectangle; matching the four vertex pixel points according to an actual size circumscribed rectangle of the drogue;

using matched vertex pixel points for RPnP pose measurement, thereby obtaining the drogue's position in the camera coordinate system and converting between the camera coordinate system, the aircraft-body coordinate system and the earth-surface inertial coordinate system, so as to obtain the position difference $\Delta x_v$, $\Delta y_v$, $\Delta h_v$ between the drogue and the probe under the earth-surface inertial coordinate system;

step 8: establishing bionic visual navigation controllers, comprising specific steps of:

when a distance in an x direction between the tanker and the receiver is less than $\Delta x_{thr}$ and the position difference $\Delta x_v$, $\Delta y_v$, $\Delta h_v$ is obtained by close-range bionic vision relative navigation through the steps 5-7, judging whether a forward position difference $\Delta x_v$ obtained by the bionic visual navigation is greater than $\Delta x_{thr}^v$; if $\Delta x_v > \Delta x_{thr}^v$, using the GPS signal for navigation control, and performing position control according to the step 4; if $\Delta x_v < \Delta x_{thr}^v$, using the bionic visual navigation signal for navigation control;

wherein a visual navigation control law uses a position control form of the step 4:

$$\theta^v_{cmd} = k_P^{vh} \cdot \Delta h_v + k_I^{vh} \cdot \int \Delta h_v + k_D^{vh} \cdot \Delta \dot{h}_v \tag{7}$$

$$V^v_{cmd} = k_P^{vx} \cdot \Delta x_v \tag{8}$$

$$\phi^v_{cmd} = k_P^{vy} \cdot \Delta y_v + k_I^{vy} \cdot \int_{\Delta y_v < \Delta y_v^{thr}} \Delta y_v + k_D^{vy} \cdot \Delta \dot{y}_v \tag{9}$$

wherein, $\theta_{cmd}^v$, $V_{cmd}^v$ and $\phi_{cmd}^v$ are respectively the inner ring pitch angle command, the speed command, and the roll angle command; $k_P^{vh}$, $k_I^{vh}$, $k_D^{vh}$, $k_P^{vx}$, $k_P^{vy}$, $k_I^{vy}$, $k_D^{vy}$ are respectively the altitude, forward deviation and lateral deviation proportional, integral and derivative coefficients of bionic visual navigation controllers; and $\Delta y_v^{thr}$ is the lateral deviation integral threshold; and step 9: determine if docking is successful, comprising specific steps of:

when bionic visual navigation $\Delta x_v < \Delta x_v^{thr}$, judging whether $\Delta y_v$ and $\Delta h_v$ are less than $\Delta y_v^{thr}$, $\Delta h_v^{thr}$; if so, docking is successful, then ending a docking process; otherwise, docking fails, then reducing a speed of the receiver, and setting a forward deviation target to $\Delta x_v^{tar}$, in such a manner that a relative distance in the x direction between the tanker and the receiver is controlled to $\Delta x_v^{tar}$ to restart the docking process.

* * * * *